United States Patent [19]

Stinson

[11] 4,148,384

[45] Apr. 10, 1979

[54] HOLLOW PISTON ASSEMBLY FOR BRAKES OR CLUTCHES

[75] Inventor: Robert A. Stinson, Aurora, Ill.

[73] Assignee: Caterpillar Tractor Co., Peoria, Ill.

[21] Appl. No.: 777,255

[22] Filed: Mar. 9, 1977

[51] Int. Cl.² .................. F16D 19/00; F16D 25/00
[52] U.S. Cl. .................. 192/85 AA; 29/156.4 R; 92/107; 92/129; 99/279
[58] Field of Search ............. 192/85 AA; 29/156.4 R; 92/107, 108, 129, 176; 99/279

[56] References Cited

U.S. PATENT DOCUMENTS

| | | | |
|---|---|---|---|
| 2,429,512 | 10/1947 | Fuller | 99/279 |
| 3,750,559 | 8/1973 | Wakabayaski | 99/279 |
| 4,040,339 | 8/1977 | Ivey | 92/176 X |

Primary Examiner—Roy Lake
Assistant Examiner—DeWalden W. Jones
Attorney, Agent, or Firm—Phillips, Moore, Weissenberger, Lempio & Majestic

[57] ABSTRACT

A hollow piston assembly for brakes or clutches comprises a first member having an annular plate portion, an inner cylindrical hub and a flange formed on the outer end of the plate portion. A second member defines an annular cavity therein and has an annular flange press-fit into a first recess defined at the juncture of the plate portion and the cylindrical hub of the first member and a radial flange press-fit into a second recess formed at juncture of the plate portion and the flange of the first member. The piston assembly may be reciprocally mounted in the housing of a brake package to selectively compress a plurality of interleaved friction discs upon pressurization of an annular actuating chamber, defined between the first member and the housing. A plurality of circumferentially disposed coil springs are mounted between the housing and the piston assembly to normally disengage the brake and to also hold the first and second members of the piston assembly in their press-fit relationship relative to each other.

13 Claims, 1 Drawing Figure

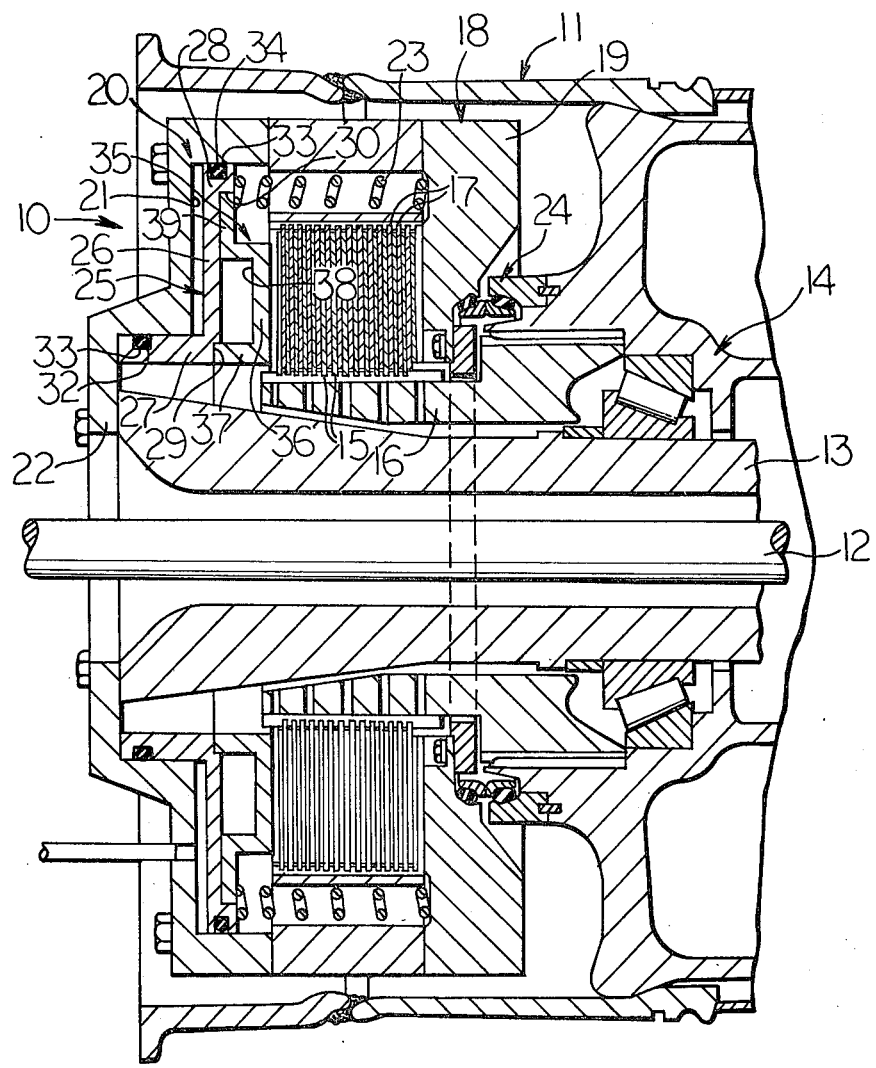

HOLLOW PISTON ASSEMBLY FOR BRAKES OR CLUTCHES

BACKGROUND OF THE INVENTION

This invention relates to a piston assembly for brakes or clutches and a method for making the same.

A conventional brake package normally comprises a plurality of interleaved friction discs and an annular piston disposed on one axial side of the friction discs to selectively compress the same for braking purposes. The piston is normally formed as a one-piece casting and machined to exhibit the required tolerances for installation in the brake package. The solid piston is weighty and requires substantial cooling time upon fabrication thereof. In addition, heat build-up in the brake package may tend to be retained in the solid piston assembly whereas it is highly desirable to dissipate as much heat as possible therefrom.

SUMMARY OF THE INVENTION

The present invention is directed to overcoming one or more of the problems as set forth above.

The present invention comprises a hollow piston assembly reciprocally mounted in a housing to selectively compress a plurality of interleaved friction discs, such as those employed in a clutch or brake. The piston assembly comprises annular first and second members mounted together in back-to-back relationship to define a chamber therebetween.

BRIEF DESCRIPTION OF THE DRAWING

Other objects of this invention will become apparent from the following description and accompanying drawing which is a cross sectional view through a brake package mounted within a wheel hub and having a hollow piston assembly of this invention incorporated therein.

DETAILED DESCRIPTION

The drawing illustrates a brake package 10 mounted within the confines of an annular wheel hub 11, such as the type mounted on a wheel tractor. An input shaft 12 is adapted to drive the hub via final drive means, not shown, in a conventional manner. The hub is rotatably mounted on a spindle 13 by a pair of axially spaced and annular bearing assemblies 14 (one shown).

Brake package 10 comprises a first set of annular friction discs 15 suitably splined to an annular carrier member 16 secured to hub 11. A second set of annular friction discs 17 are suitably splined on a housing 18 and interleaved with the first set of friction discs 15. Housing 18 is suitably secured to stationary spindle 13 whereby selective compression of the friction discs against an annular back-up plate 19 of housing 18 will brake and retard rotation of hub 11 relative to spindle 13.

Brake package 10 further comprises a hollow piston assembly 20, embodying this invention, which defines an actuating chamber 21 between it and an outer cover plate 22 of housing 18. The brake is normally held in an "off" condition of operation by a plurality of circumferentially disposed coil springs 23, engaged between back-up plate 19 and piston assembly 20. The brake package is oil-cooled in a conventional manner and an annular sealing assembly 24 of the sliding-type is suitably mounted between the brake package and the wheel hub to prevent the egress of oil thereby.

Piston assembly 20 comprises an annular first member 25 having a substantially flat plate portion 26, a cylindrical hub 27 formed on an inner end of a plate portion and a flange 28 formed on an outer end of the plate portion. A first annular recess 29 is defined at the juncture of plate portion 26 and hub 27 whereas a second annular recess 30 is defined at the juncture of the plate portion and flange 28.

An annular groove 31 is formed externally on hub 27 of first member 25 and seats an O-ring seal 32 therein. A second annular groove 33 is formed externally on flange 28 of the first member and seats an O-ring seal 34 therein. As shown, the seals maintain sealing contact between the housing and the piston assembly upon reciprocation of the piston assembly between its brake "on" and brake "off" conditions of operation.

The piston assembly further comprises an annular second member 35 disposed in back-to-back relationship with respect to first member 25. The second member comprises an annular wall portion 36 having an annular flange 37 secured on an inner end thereof and disposed in recess 29 of the first member. The second member is formed with annular cavity 38 defined therein and has a radial flange 39 formed on the outer end thereof and disposed on plate portion 26 of the first member and further disposed in recess 30 formed thereon. It should be noted that flanges 37 and 39 of the second member engage recesses 29 and 30 of the first member in press-fit relationship therewith and are held in such relationship by springs 23 which engage portions of both members.

The piston assembly is formed by the following steps. First member 25 is suitably die cast along with second member 35. The members are press-fitted together to dispose flanges 37 and 39 of the second member within recesses 29 and 30 of the first member, respectively. Brake package 10 is thereafter assembled with piston assembly 20 mounted therein as shown in the drawing and biased leftwardly to the brake "off" condition of operation by springs 23. As mentioned above, springs further function to bias the first member into its press-fit relationship with the second member.

The embodiments of the invention in which an exclusive property or privilege is claimed are defined as follows:

1. A hollow piston assembly reciprocally mounted in a housing and a plurality of interleaved friction discs are mounted in said housing, said piston assembly engaging one side of said friction discs to selectively compress the same and comprising an annular first member, an annular second member mounted on said first member in back-to-back relationship therewith, and means defining an annular chamber between said first and second members.

2. The piston assembly of claim 1 further comprising spring means disposed between said housing and said piston assembly for normally biasing said piston assembly away from said friction discs.

3. The piston assembly of claim 2 further comprising actuating chamber means defined between said piston assembly and said housing adapted to have a pressurized fluid communicated thereto for selectively moving said piston assembly against said friction discs to compress the same.

4. The piston assembly of claim 3 further comprising first annular sealing means mounted on an inner end of said first member to engage said housing in sliding and sealing contact therewith and second annular sealing means mounted on an outer end of said first member and engaging said housing in sliding and sealing contact therewith.

5. The piston assembly of claim 3 further comprising a spindle having said housing secured thereto and a wheel hub assembly rotatably mounted on said spindle, said friction discs comprising a first set of friction discs splined on said wheel assembly and a second set of friction discs splined on said housing and interleaved with said first friction discs.

6. The piston assembly of claim 5 wherein the one side of said friction discs are disposed in axial opposition to said piston assembly to be selectively compressed thereby and wherein a second side of said friction discs are axially opposed to a back-up plate secured to said housing to form a brake package whereby selective compression of said friction discs will brake said wheel assembly relative to said housing.

7. A method for forming a hollow piston assembly comprising the steps of
die casting an annular first member to form first and second recesses on inner and outer portions thereof,
die casting a second member to form an annular cavity therein and a radial flange and an annular flange on inner and outer ends thereof, respectively, and
press-fitting the radial and annular flanges of said second member into the first and second recesses of said first member, respectively.

8. The method of claim 7 further comprising the step of forming an annular recess externally on the inner portion of said first member and forming an annular recess on the outer portion of said first member, each adapted to retain an O-ring seal therein.

9. The method of claim 7 further comprising the step of reciprocally mounting said piston assembly in a housing to define an annular actuating chamber therewith and mounting a plurality of friction discs in said housing in axial opposition to said piston assembly.

10. The method of claim 9 further comprising the step of mounting spring means between said housing and said piston assembly to bias said piston assembly away from said friction discs.

11. The method of claim 10 wherein the step of mounting said spring means in said housing comprises the step of mounting said spring means to engage both said first and second members to aid in press-fitting the radial and annular flanges formed on said second member into the first and second recesses formed on said first member, respectively.

12. The method of claim 11 further comprising the step of securing said housing to a spindle and rotatably mounting a wheel hub assembly on said spindle with a first set of said friction discs being mounted on said wheel assembly and a second set of said friction discs, interleaved with the first set thereof, being mounted on said housing.

13. The piston assembly of claim 2 wherein said spring means is disposed between said housing and the first and second members of said piston assembly for holding said first and second members together.

* * * * *